Dec. 25, 1962 E. H. VALENTINE 3,069,815

CLEANING TAPE FOR INFORMATION SENSING APPARATUS

Filed Oct. 2, 1958

INVENTOR.
EDWARD H. VALENTINE

BY Robert C. Sullivan

ATTORNEY

United States Patent Office 3,069,815

Patented Dec. 25, 1962

3,069,815
CLEANING TAPE FOR INFORMATION SENSING APPARATUS

Edward H. Valentine, Hopewell Junction, N.Y., assignor to International Business Machines Corporation, New York, N.Y., a corporation of New York Filed Oct. 2, 1958, Ser. No. 764,909
3 Claims. (Cl. 51—185)

This invention relates to tapes for use with information sensing apparatus, and more particularly to a cleaning tape for use in cleaning the tape driving and sensing components of apparatus employing information bearing tapes.

The article of the invention has particular utility in cleaning the tape driving and sensing components of apparatus employing magnetic tape and will be described as embodied in such apparatus. However, it will be understood that the cleaning tape of the invention can be used in connection wtih other apparatus employing intelligence bearing tape, such as motion picture projectors, for example, and that the expression "information sensing apparatus" as used herein is intended to embrace all such apparatus.

In the operation of data processing machines using magnetic tape, it has been necessary to frequently shut down the apparatus in order to clean the magnetic head and the drive mechanism for the magnetic tape. Frequent cleaning is necessary principally due to the fact that during usage of the apparatus loose particles of the magnetic tape collect on the various components of the apparatus, including the magnetic head, capstans, idlers, pulleys, vacuum columns, and the like. These loose particles of the tape cause errors in the information sensing process and also cause wear on the tape passing through the apparatus which greatly accelerates the reaching of a break-down point at which the signal strength of the tape is no longer acceptable.

The methods of cleaning information sensing apparatus used in the past have usually involved a certain amount of dismantling of the apparatus and the manual application of a brush and a cleaning solvent. These methods inherently involve a shut-down of the machine.

The necessity for frequent shutdowns for cleaning the apparatus is very undesirable since it not only entails the loss of apparatus operating time, but is also quite expensive due to the fact that the cleaning operation requires the working time of skilled personnel familiar with the apparatus.

Accordingly, it is an object of this invention to provide a device for automatically cleaning the tape drive mechanism and the sensing head of an apparatus employing information bearing tape.

It is another object of this invention to provide a device for cleaning apparatus utilizing information bearing tape which largely eliminates the manual cleaning operations of the prior art used with such machines and greatly reduces the frequency of shutdowns for cleaning operations, as well as the personnel time required for such cleaning operations.

It is still another object of this invention to provide a cleaning tape adapted to be integrally connected to an information bearing tape for automatically cleaning the tape drive and sensing components of the apparatus which utilizes the information bearing tape.

A further object of the invention is to provide a cleaning tape for use with information bearing tape which causes a significant increase in the permissible usage or number of passes of the information bearing tape before a breakdown in tape signal strength occurs.

In achievement of these objectives, there is provided in accordance with an embodiment of this invention a device for cleaning the tape drive and sensing components of an apparatus in which an elongated cleaning tape is passed through the apparatus along the same path as that followed by the information bearing tape. The cleaning tape includes absorbent and abrasive sections connected in series with each other and respectively adapted to absorb loose particles of dirt and oxide and to loosen and polish down high spots caused by oxide build-up on the sensing and drive components of the apparatus. The cleaning tape is preferably connected as a leader onto an end of the information bearing tape but is necessarily so connected and may instead be run through the apparatus independently of the information bearing tape.

Further objects and advantages of the invention will become apparent from the following description taken in conjunction with the accompanying drawing in which.

Figure 1:
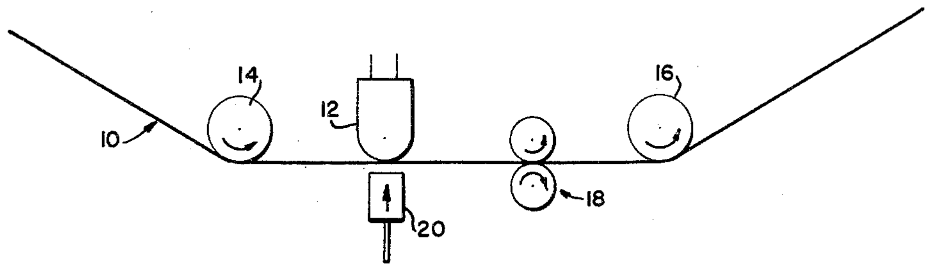
FIG. 1 is a diagrammatic view showing an information bearing tape being moved past a sensing head by a tape drive mechanism.

Referring now to the drawing, a magnetic tape generally indicated at 10 is shown in the diagrammatic view of FIG. 1 being moved by a tape drive mechanism past a magnetic sensing head 12. The drive mechanism and its associated components include idler pulleys 14 and 16, capstans 18, and pressure pad 20. Tape 10 may also pass through vacuum columns disposed adjacent the payout tape reel and the take-up reel as is well known in the art of magnetic tape data processing machines.

Figure 2:
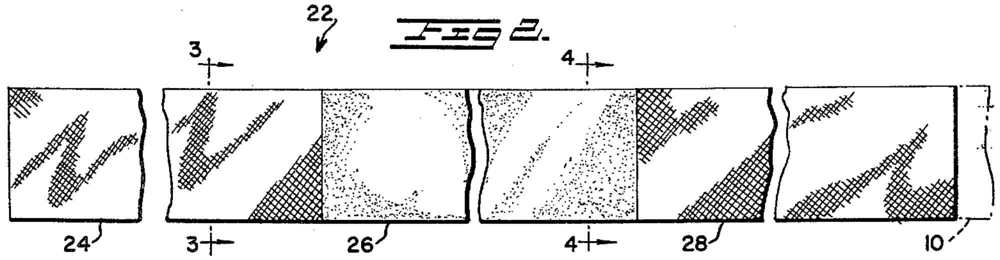
FIG. 2 is a plan view of the cleaning tape in accordance with the invention.
Figure 3:
FIG. 3 is a view of the absorbent section of the cleaning tape along section line 3—3 of FIG. 2.
Figure 4:
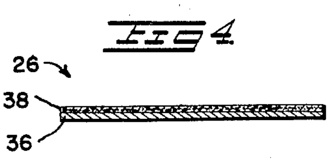
FIG. 4 is a view of the abrasive section of the cleaning tape along line 4—4 of FIG. 2.

The cleaning tape in accordance with the invention is indicated at 22 in FIG. 2 and is adapted to be connected as a leader onto the beginning or end of a roll of the magnetic tape 10 of FIG. 1. Cleaning tape 22 includes a first absorbent section 24, an abrasive section 26, and a second absorbent section 28. The three cleaning tape sections 24, 26 and 28 are spliced to each other in series relation and in a preferred embodiment for use with a tape in a magnetic tape unit of a data processing machine such as the "IBM" 727 Tape Machine. The total length of the cleaning tape is nine feet, with each of the respective sections 24, 26 and 28 being three feet in length. It has been found that when the preferred length just specified is used with the "IBM" 727 Tape Machine the cleaning tape reaches its end of life at substantially the same time as the magnetic recording tape. The optimum length of cleaning tape for use with other apparatus using information bearing tape may vary and must be determined empirically. The length of the cleaning tape should be such that the operating life of the cleaning tape substantially equals the operating life of the information bearing tape.

One of the principal factors in determining length of life of the cleaning tape is the capacity of the absorbent sections 24 and 28 to absorb particles of dirt and iron oxide without becoming saturated. It has been found that by making the cleaning tape sections of longer length, a buffer or safety zone is provided on the absorbent sections of the tape. As the forward portions of the absorbent sections become saturated with dirt and oxide particles, the buffer zone become successively smaller until finally, if the cleaning tape length has been properly chosen, the cleaning tape reaches its end of life at the same time as the recording tape.

Absorbent sections 24 and 28 are identical to each other and section 24 will be described as typical of both sections 24 and 28. Section 24 includes a base tape 30 preferably formed of a plastic material such as the polyethylene terephthalate resin film manufactured by E. I. du Pont de Nemours & Co. and sold under the registered trademark "Mylar." Base tape 30 has secured thereto a strip 32 of an absorbent cloth material, preferably a tightly woven nylon having its warp and woof threads running at a 45 degree angle to the longitudinal axis of the tape. Other absorbent materials could be used, such as Irish linen, silk, or other suitable porous material. However, nylon is the preferred absorbent cloth material for the absorbent section since the overhanging fibers of the nylon cloth do not break or pull out during usage of the cleaning tape. In this connection, it should be noted that although the strip 32 of absorbent cloth material is cut to the same lateral dimension as base tape 30 at the time of manufacture of the cleaning tape, the fibers of the cloth strip 32 begin to slightly overhang the edges of the base tape 30 after the cleaning tape has gone into use. This causes the absorbent cloth strip 32 to clean a somewhat wider path along the route which it follows than the width of base tape 30. The overhanging fibers of the nylon cloth do not break or pull out to add to the cleaning problem, as may happen in the case of other cloth materials.

In an actual reduction to practice of the absorbent section 24, cloth strip 32 is made of an all nylon cloth manufactured by Putnam Mills Corp., Quality #88, with a weave specification of 116 x 90, 79 denier. The nylon cloth has a thickness in the range of 2 to 4 mils, with the latter thickness being preferred due to its greater capacity for absorbing oxide and dirt particles from the apparatus. The all nylon cloth strip 32 is cut from a piece of material so that the main threads are at an angle of 45 degrees to the lengthwise axis of the strip 32. Strip 32 is then applied to a "Mylar" base tape 30 of approximately one mil thickness by 2½ inches wide, the exact thickness of the base tape 30 depending on the thickness of cloth strip 32. Cloth strip 32 is positioned on base tape 30 with the lengthwise axis of strip 32 coinciding with the lengthwise axis of base tape 30 so that the threads of the nylon cloth are at 45 degrees to the lengthwise axis of base tape 30. The nylon strip is secured firmly and without wrinkling to the "Mylar" base tape 30 by a ½ mil thick layer of a suitable adhesive cement indicated at 34, such as that manufactured and sold by the Goodyear Tire & Rubber Co. under the registered trademark "Pliobond." The composite tape, including the "Mylar" base tape 30 and the adhesively attached nylon strip 32 is then wrapped around a smooth form and cured in an oven for one hour at 90 degrees centigrade. The cured tape is then cooled at room temperature for one-half hour and slit into desired widths.

Abrasive section 26 of cleaning tape 22 includes a "Mylar" base tape 36 having an abrasive coating 38. Abrasive coating 38 in a preferred embodiment is made of an abrasive mixture consisting of two parts ferric oxide ($Fe_2O_3$) to three parts Horton binder, said binder being described in the patent application to Horton et al., Serial No. 703,751, filed December 19, 1958, issued as Patent No. 2,989,415, dated June 20, 1961. The ferric oxide is preferably of one micron particle size. This abrasive mixture after having been intimately mixed together, is applied with a thickness of 0.5–0.75 mil on one surface of a "Mylar" base 36 having a thickness of 1.4 ml. The abrasively coated tape is first dried at room temperature for ¼ hour and is then wrapped tightly around a smooth form such as a glass beaker 5 inches in diameter and hardened in an oven for 8 hours or more at 100 degrees centigrade. The tape is then cooled at room temperature for ½ hour and slit into desired widths.

While the abrasive coating on tape section 26 is preferably made of the constituents just described, other suitable abrasive materials may be used, such as jeweler's rouge, or fine grit.

When the magnetic tape 10 is run through the data processing machine or other apparatus utilizing the tape, the attached cleaning tape 22 comes into contact with the magnetic head and with the various component parts of the drive mechanism for the tape. When the first section of the absorbent tape, which may be either section 24 or 28 depending upon the direction in which the tape is being driven, comes in contact with the magnetic head and the various parts of the drive mechanism, loose dirt or oxide particles are absorbed into the pores of the absorbent material. The abrasive section 26 then follows and loosens and polishes down any high spots caused by oxide build-up on the head or other component parts and also removes stubborn dirt particles. The third section, or second absorbent section, then follows and performs the same cleaning function as the first absorbent section. The symmetrical construction of the cleaning tape 22 including separate absorbent sections 24 and 28 on either side of the centrally located abrasive section 26, facilitates cleaning operation by the tape on both the forward and the reverse direction of motion of magnetic tape 10.

While the cleaning tape of the invention has been described as being integrally connected as a leader on the information bearing tape and is preferably used in this manner, the cleaning tape could, if desired, be used by itself rather than being integrally connected to the information bearing tape.

It will be obvious from the foregoing that there is provided in accordance with this invention a cleaning tape and method of cleaning of great utility in connection with apparatus employing information bearing tapes. The cleaning tape and method of cleaning of the invention greatly reduce the shutdown time required for cleaning data processing machines and the like since they greatly extend the non-maintenance period between successive shutdowns for cleaning such apparatus. Furthermore, the cleaning tape and method of cleaning of the invention result in a great economic saving since the man-hours required for cleaning machines using magnetic tapes and the like is greatly reduced due to the use of the cleaning tape of the invention.

While there have been shown and described and pointed out the fundamental novel features of the invention as applied to a preferred embodiment, it will be understood that various omissions and substitution and changes in the form and details of the device illustrated and in its operation may be made by those skilled in the art, without departing from the spirit of the invention. It is the intention, therefore, to be limited only as indicated by the scope of the following claims.

What is claimed is:

1. An elongated tape for use with information sensing apparatus and the like, comprising an information bearing section and a cleaning section connected in series with said information bearing section, said cleaning section comprising a base tape having substantially the same lateral dimension as the information bearing section, an absorbent cleaning material positioned on an outer surface of said base tape for a portion of the length of said base tape, and an abrasive material positioned on said outer surface of said base tape for the remainder of the length of said base tape.

2. A cleaning device for use with apparatus employing information bearing tape comprising a base tape having substantially the same lateral dimension as the information bearing tape employed on the apparatus, an absorbent cleaning material positioned on an outer surface of said base tape for a portion of the length of said base tape, and an abrasive material positioned on said outer surface of said base tape for the remainder of the length of said base tape.

3. A cleaning device for use with apparatus employing information bearing tape, comprising a base tape having substantially the same lateral dimension as the information bearing tape employed on the apparatus, first and second sections of absorbent cleaning material and a section of abrasive material positioned in lengthwise series relation with each other on an outer surface of said base tape, said section of abrasive material being positioned serially between said first and second sections of absorbent cleaning material.

References Cited in the file of this patent

UNITED STATES PATENTS

| | | |
|---|---|---|
| 702,866 | Britton | June 17, 1902 |
| 708,000 | Allen | Sept. 2, 1902 |
| 1,199,836 | Sweet | Oct. 3, 1916 |
| 1,813,026 | Coole | July 7, 1931 |
| 2,606,409 | Gordon | Aug. 12, 1952 |

FOREIGN PATENTS

| | | |
|---|---|---|
| 733,484 | Great Britain | July 13, 1955 |